United States Patent [19]

Kamiya et al.

[11] Patent Number: 5,896,784
[45] Date of Patent: Apr. 27, 1999

[54] DIE FOR SUPERPLASTIC FORMING OF TITANIUM-BASED ALLOY

[75] Inventors: Akira Kamiya; Katsuyoshi Naganuma; Makoto Kato, all of Aichi, Japan

[73] Assignee: Japan as represented by Director General of Agency of Industrial Science and Technology, Tokyo, Japan

[21] Appl. No.: 08/819,369

[22] Filed: Mar. 17, 1997

[30] Foreign Application Priority Data

Mar. 18, 1996 [JP] Japan .................................. 8-090359

[51] Int. Cl.$^6$ ....................................................... B21K 5/20
[52] U.S. Cl. ................................ 76/107.1; 72/60; 72/709
[58] Field of Search ............................... 76/107.1, 107.4; 72/709, 60, 61

[56] References Cited

U.S. PATENT DOCUMENTS

| | | | |
|---|---|---|---|
| 4,824,373 | 4/1989 | Okada et al. | 433/200.1 |
| 5,214,949 | 6/1993 | Cadwell | 72/60 |
| 5,467,626 | 11/1995 | Sanders | 72/709 |
| 5,638,724 | 6/1997 | Sanders | 72/60 |

FOREIGN PATENT DOCUMENTS 63-95048  4/1988  Japan .

OTHER PUBLICATIONS

JACT News, No. 459, pp. 21–28, Mar. 20, 1995, K. Sato, et al., "Casting Technology of Titanium".

Reports of the Government Industrial Research Institute, vol. 39, Nos. 7–8, pp. 309–317, M. Kato, et al., "On the Dental Application of Titanium Based Alloy (Part 2) Ceramic Die For Superplastic Forming".

*Primary Examiner*—David Jones
*Attorney, Agent, or Firm*—Oblon, Spivak, McClelland, Maier & Neustadt, P.C.

[57] ABSTRACT

The present invention provides a die for superplastic forming of titanium-based alloy with high-workability, which is inexpensive and easy to handle, and has detailed shape-reproducibility and no reactivity with titanium-based alloy to be processed, and has excellent accordance with it in a thermal expansion coefficient. This invention relates to a die for superplastic forming of titanium-based alloy characterized by comprising quartz, cristobalite and calcium silicate. The above die for superplastic forming of titanium-based alloy is produced by kneading a mixed powder of quartz and cristobalite, together with a binder containing a plaster additive of less than 30 weight % based on the total amount with water, forming the mixture, drying the formed product and sintering it in the atmosphere to convert the plaster additive into calcium silicate.

19 Claims, 4 Drawing Sheets

DIE FOR SUPERPLASTIC FORMING OF TITANIUM-BASED ALLOY

DESCRIPTION OF THE INVENTION

The present invention relates to a die for superplastic forming of titanium-based alloy comprising quartz, cristobalite and calcium silicate; more specifically, the present invention relates to a novel die for superplastic forming of titanium-based alloy, which is easy to handle and can be produced conveniently, and which accords with titanium-based alloy in a thermal expansion coefficient finely and makes it possible to make superplastic forming of titanium-based alloys remarkably facilitate.

BACKGROUND OF THE INVENTION

Since titanium-based alloys have high reactivity at a high temperature, materials to be utilized as a die for molding or superplastic forming thereof are restricted extremely. Materials conventionally utilized for a die for casting include, (1) copper and mild steel, (2) graphite, (3) oxides such as zirconium, rare earth elements and calcium, and (4) metals with a high melting point such as niobium and molybdenum (Kei Sato and Takashi Yoneda, "Casting Technology of Titanium", JACT News, No. 459, published on Mar. 20, 1995, pp. 21–28). On the other hand, though superplastic forming is performed at a lower temperature than molding, calcium oxide not reacting with titanium-based alloys is also employed as a main component of a die (Makoto Kato and Hitoshi Murakami, "On the Dental Application of Titanium-based Alloy (Part 2) Ceramic Die for Superplastic Forming", Reports of the Government Industrial Research Institute, Nagoya, Vol. 39, Nos. 7–8, pp. 309–317, 1990). Since these dies are expensive or have a tendency to deteriorate owing to water existing in the atmosphere, the development of a die to be used more conveniently has been desired. In particular, if a die for superplastic forming with a high-workability not requiring the melting of titanium-based alloys is obtained, it can be possible to perform forming of titanium-based alloys conveniently.

Thus, dies conventionally used for forming of titanium-based alloys are not so sufficient. In particular, if a die for superplastic forming with a high-workability not requiring the melting of titanium-based alloys is obtained, the forming of titanium-based alloys can be performed easily. In view of the above prior arts, the present inventors have engaged in assiduous studies with a view to developing a die for superplastic forming capable of forming of titanium-based alloys easily, and as a result have succeeded in preparing a die with a high-workability comprising quartz, cristobalite and calcium silicate, which has led to the accomplishment of the present invention.

SUMMARY OF THE INVENTION

The present invention provides a die for superplastic forming of titanium-based alloy with high-workability, which is inexpensive and easy to handle, and has detailed shape-reproducibility and no reactivity with titanium-based alloy to be processed, and has excellent accordance with it in a thermal expansion coefficient. This invention relates to a die for superplastic forming of titanium-based alloy characterized by comprising quartz, cristobalite and calcium silicate.

The above die for superplastic forming of titanium-based alloy is produced by kneading a mixed powder of quartz and cristobalite, together with a binder containing a plaster additive of less than 30 weight % based on the total amount with water, forming the mixture, drying the formed product and sintering it in the atmosphere to convert the plaster additive into calcium silicate.

DETAILED DESCRIPTION OF THE INVENTION

Figure 1:
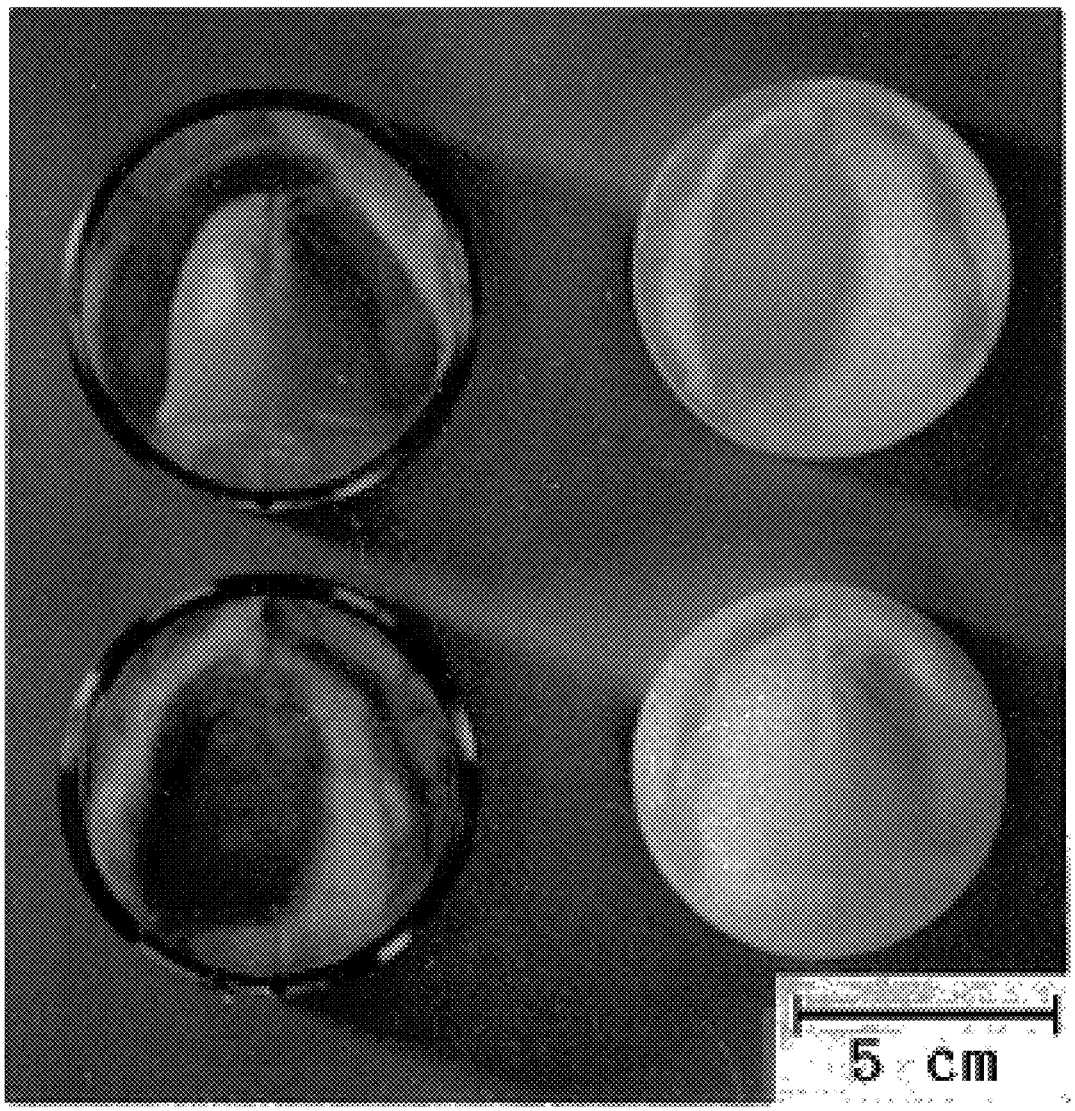
FIG. 1 shows a photograph of the plaster model of oral cavity (left) and the formed die for superplastic forming of titanium-based alloy (right).

The present invention provides a die for superplastic forming of titanium-based alloy with a high-workability from such viewpoints. That is, it provides a die being easy to handle and capable of being prepared conveniently, the obtained die is characterized by having the excellent accordance with titanium-based alloys to be processed in a thermal expansion coefficient, and having sufficiently low reactivity, being capable of expanding the use of titanium-based alloys and thereby making a great contribution to the industrial world.

The present invention for solving the above subject is a die for superplastic forming of titanium-based alloy comprising quartz, cristobalite and calcium silicate; in addition, the present invention is a die for superplastic forming of titanium-based alloy obtained by the processes of kneading a mixed powder of quartz and cristobalite being inexpensive and chemically stable, together with a binder containing a plaster additive of less than 30 weight % based on the total amount with water, forming the mixture, drying the formed product and sintering it in the atmosphere to convert the plaster additive into calcium silicate. Further, another embodiment of the present invention is the above die for superplastic forming, wherein the particle diameter of the mixed powder of quartz and cristobalite is less than 325 meshes and at least one of quartz and cristobalite contains a powder with a particle diameter of more than 30 $\mu$m. The expression a of "comprising quartz, cristobalite and calcium silicate" means that they are contained as main components, and it goes without saying that other components may be contained properly if necessary.

These material powders are inexpensive and chemically stable, and hence easy to handle. Besides, the accordance of thermal expansion coefficients of a titanium-based alloy and the powders, which is important in actual processing, can be obtained easily by mixing quartz and cristobalite at a ratio capable of being accorded with the thermal expansion coefficient of the titanium-based alloy to be processed. Moreover, since the plaster additive of less than 30 weight % based on the total amount is added to them as a binder, the materials can be converted to slip easily by kneading them with water. Hence, a die with a detailed shape can be prepared easily according to a lost wax process and the like, and the obtained die has sufficient strength after solidified. Moreover, since the formed die is sintered at temperature beyond the decomposition temperature of the plaster additive to convert the plaster additive into calcium silicate, no reaction with a titanium-based alloy to be processed occurs.

When the particle diameter of a mixed powder of quartz and cristobalite is too large, a die with sufficient strength cannot be obtained. A powder with a too large particle diameter is disadvantageous since the surface roughness of a titanium-based alloy after processing is affected thereby. Surface roughness needed for the materials to be processed is various and the required particle diameter of a powder materials cannot be defined sweepingly. In order to obtain a die with sufficient strength, however, it is required that the particle diameter of a mixed powder of quartz and cristobalite is less than 325 meshes. On the other hand, the formed die is sintered in the atmosphere with a view to converting the plaster additive into calcium silicate; hence, if the particle diameter of a mixed powder of quartz and cristobalite is too fine, the shrinkage of a die owing to sintering occurs undesirably. Hence, it is necessary that at least one of quartz and cristobalite contains a powder with a particle diameter of more than 30 $\mu$m.

Plaster additive to be added as a binder may be, for example, ordinary gypsum hemi-hydrate and is not particularly restricted; however, if the amount thereof is too large, the majority of quartz and cristobalite as main components of a die are converted into calcium silicate after sintering and consumed undesirably. In order that quartz and cristobalite as main components of a die remain sufficiently after sintering and that the properties thereof are kept, the amount of the plaster additive to be added must be less than 30 weight % based on the total amount. The ratio between quartz and cristobalite is designed according to the thermal expansion coefficient of a material to be processed. These powder are mixed homogeneously by an ordinary mortar, a grinder or a ball mill.

After quartz, cristobalite and plaster additive are mixed to obtain a powder materials, water is added therein and the mixture is kneaded. The amount of water to be added must be beyond the amount required for gypsum hemi-hydrate to be converted to gypsum di-hydrate. Specifically, a product obtained by adding 30 weight % of plaster additive as a binder and adding 35 g of water to 100 g of a powder to make slip is the most preferable for preparing a die according to a slip casting process. If water of more than 50 g is added to them, the concentration of the slip becomes too thin and it becomes to be difficult to use the slip. On the other hand, if 5.6 g of the minimum amount of water needed to 100 g of a powder with 30 weight % of plaster additive as a binder are added, it becomes difficult to obtain slip. However, in this case, a die can be prepared by press molding of the mixture immediately after adding water to it.

The prepared die is sintered in the atmosphere at a temperature beyond 1100° C. of the decomposition temperature of gypsum after surplus water is removed at a temperature below 100° C. Thereby, the plaster additive reacts with quartz and cristobalite to be converted into calcium silicate.

According to the above process, a die for superplastic forming of titanium-based alloy according to the present invention is prepared.

Next, the present invention will be described specifically according to Example; however, the present invention is not restricted to Example below at all.

EXAMPLE

Figure 2:
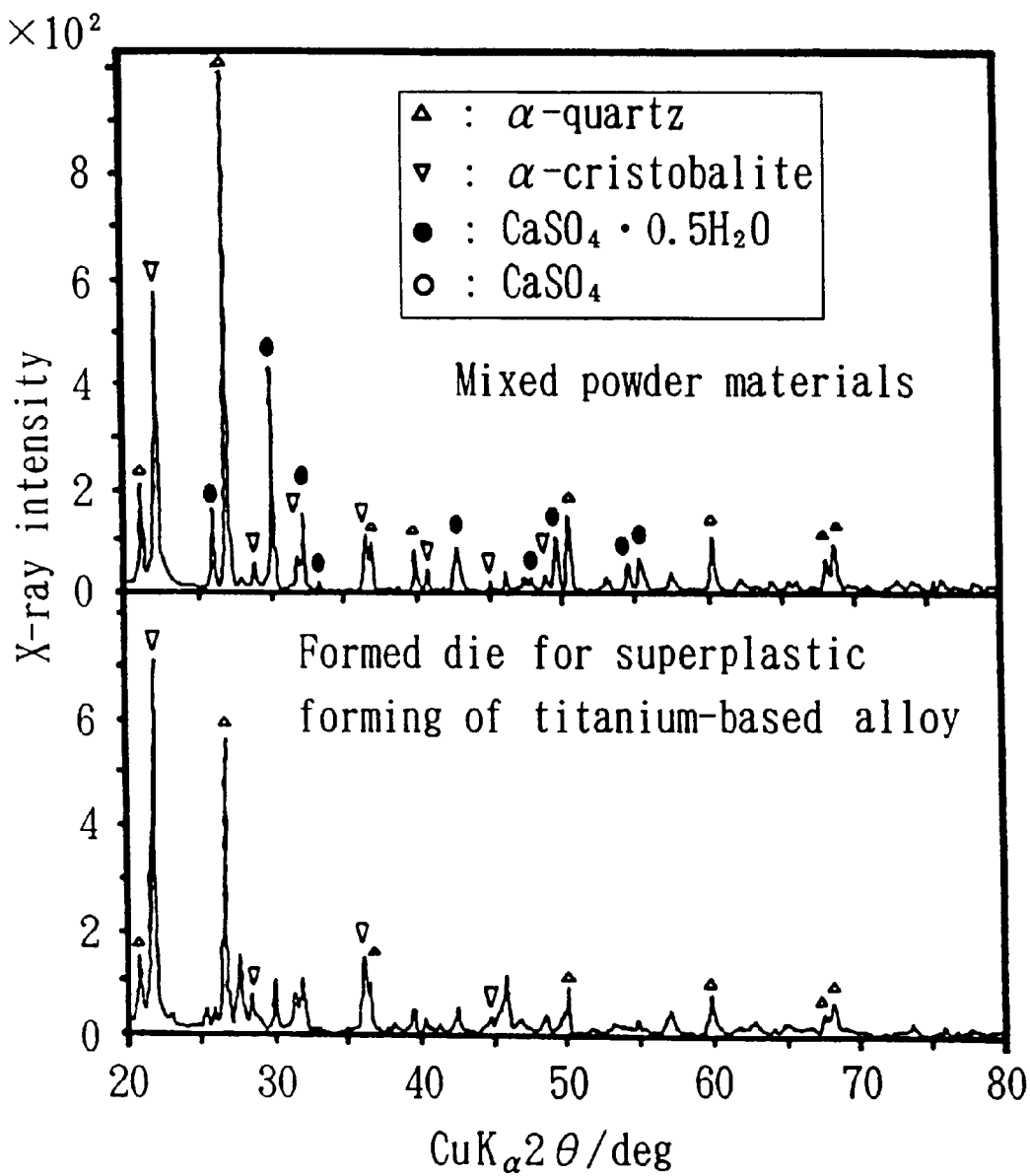
FIG. 2 shows a pattern of powder X-ray diffraction of the mixed powder materials and the formed die for superplastic forming of titanium-based alloy.

A quartz powder of less than 325 meshes and a cristobalite powder were mixed at a ratio of 3:2; 30 weight % of gypsum hemi-hydrate was added thereto as a binder and the mixture was stirred with a grinder for 10 minutes; and 70 g of water were added to 200 g of the obtained powder and kneaded to prepare slip. The slip was poured into a plaster model of oral cavity to form a shape of a die; it was dried at 80° C. in the atmosphere for 12 hours, and the temperature was raised by 3° C. per minute, up to 1200° C., and it was kept in the condition for 6 hours and then sintered to prepare a die for superplastic forming of titanium-based alloy. A photograph of the plaster model of oral cavity and the formed die for superplastic forming of titanium-based alloy is shown in FIG. 1. Thus, a die having a good shape with sufficient detail of the shape of complicated folds of soft tissues in oral cavity was obtained. A pattern of powder X-ray diffraction of the mixed powder materials and the formed die for superplastic forming of titanium-based alloy is shown in FIG. 2. Thus, since the die is sintered at 1200° C. beyond the decomposition temperature of gypsum, the diffraction peak of gypsum is disappeared completely.

As a material to be processed was employed SP-700 (manufactured by Nihon Kokan, JP). This alloy comprises 4.5 weight % of Ti, 3 weight % of Al, 2 weight % of V, 2 weight % of Fe and 2 weight % of Mo. The thermal expansion coefficients of the formed die and that of this alloy are shown in Table 1.

TABLE 1

Thermal Expansion Coefficients of Formed Die and SP-700 Alloy

| Temperature (° C.) | | 650 | 700 | 725 | 750 | 775 | 800 |
|---|---|---|---|---|---|---|---|
| Thermal expansion coefficient × $10^{-6}$/ ° C. | SP-700 | 18.5 | 18.6 | 18.6 | 18.5 | 18.6 | 18.6 |
| | Die | 17.5 | 17.6 | 17.4 | 17.3 | 17.4 | 18.0 |

As is apparent from Table 1, the accordance of thermal expansion coefficients between the formed die and the material to be processed was excellent in a wide temperature range of 650 to 800° C.

Figure 3:
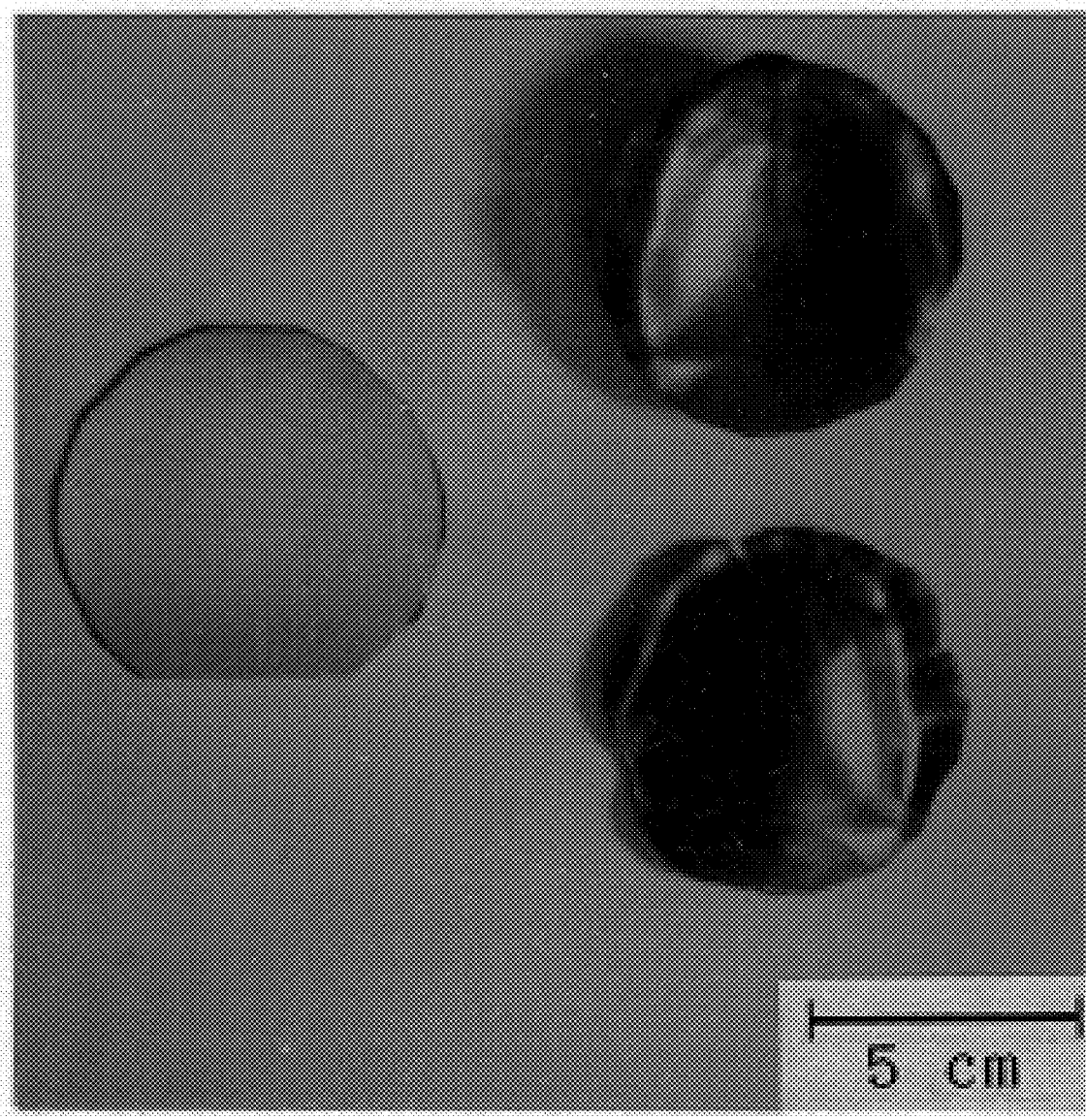
FIG. 3 shows a photograph of the SP-700 alloy plate to be processed (left) and the formed denture base (right).
Figure 4:
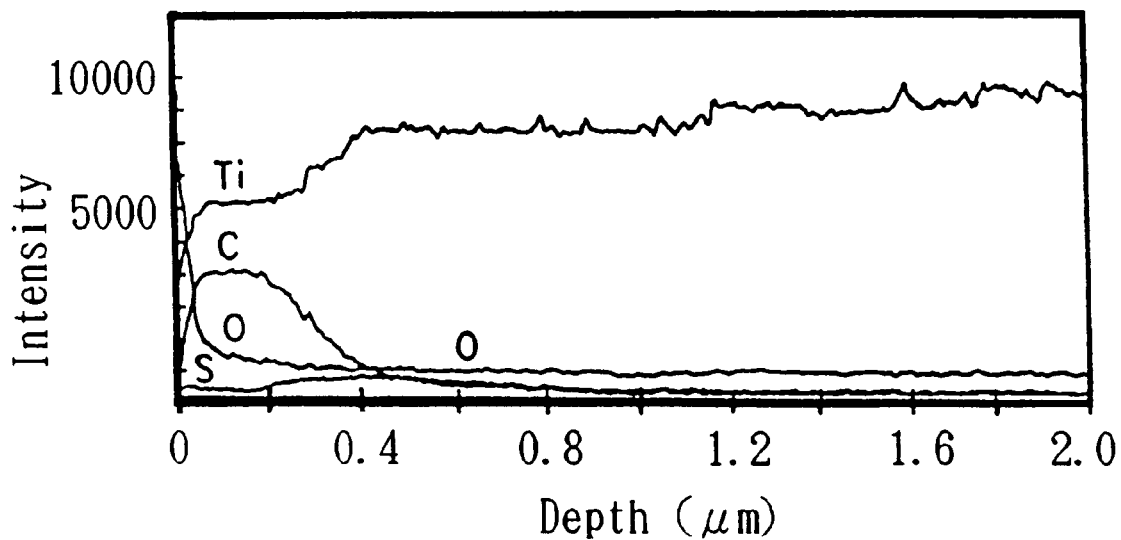
FIG. 4 shows results of AES in-dept analysis of the formed denture base.

Superplastic forming of this alloy employing the formed die was performed at 725° C. under vacuum of $10^{-3}$ Torr at a deformation rate of 0.1 mm per minute. Thereby, a denture base of titanium-based alloy having a good shape with sufficient detail of the oral cavity was obtained. The surface of the obtained denture base had a metallic gloss and showed slight discoloration. As results of analysis according to Auger electron spectrophotometry (AES in-depth analysis), the oxidation of the surface of the material to be processed was less than 0.4 $\mu$m, which was unprecedentedly excellent. A photograph of the SP-700 alloy plate to be processed and the formed denture base is shown in FIG. 3, and the results of AES in-depth analysis of the surface of the formed denture base is shown in FIG. 4. As the results of the same procedures performed by changing the constitution of materials within the scope of the present invention, almost the same results were obtained.

Thus, it has been revealed that dies for superplastic forming of titanium-based alloy including those with detailed shape-reproducibility can be produced easily according to the present invention and that they have excellent workability in superplastic forming of titanium-based alloys.

A die for superplastic forming of titanium-based alloy according to the present invention is inexpensive and easy to handle as compared with conventional ones, and, as described specifically in Example above, it has detailed shape-reproducibility and high workability in superplastic forming of titanium-based alloys. Thereby, it has become easy to perform processing of titanium-based alloys, and the field of utilization thereof has been spread remarkably.

What is claimed is:

1. A die for superplastic forming of titanium-based alloy comprising: quartz, cristobalite and calcium silicate.

2. The die of claim 1, wherein said die consists essentially of said quartz, said cristobalite and said calcium silicate.

3. The die of claim 1, wherein said die is prepared by sintering a formed product comprising quartz, cristobalite and plaster.

4. A process for making the die of claim 1, comprising:
   drying a formed product comprising quartz, cristobalite and plaster; and
   sintering said formed product.

5. The process of claim 4, further comprising, prior to said drying and sintering:
   preparing a mixture comprising said quartz, said cristobalite, said plaster and water; and
   shaping said mixture to prepare said formed product.

6. The process of claim 4, wherein said quartz and said cristobalite are powders having a particle diameter of less than 325 mesh.

7. The process of claim 6, wherein said particle diameter of said quartz, said cristobalite, or both said quartz and said cristobalite, is more than 30 $\mu$m.

8. The process of claim 5, wherein said quartz and said cristobalite are powders having a particle diameter of less than 325 mesh.

9. The process of claim 8, wherein said particle diameter of said quartz, said cristobalite, or both said quartz and said cristobalite, is more than 30 $\mu$m.

10. The process of claim 5, wherein said mixture comprises less than 30 weight % of said water, based on the total weight of said mixture.

11. The die of claim 5, wherein said quartz and said cristobalite in said formed product are powders having a particle diameter of less than 325 mesh.

12. The die of claim 11, wherein the particle diameter of said quartz, said cristobalite, or both said quartz and said cristobalite, in said formed product, is more than 30 $\mu$m.

13. The process of claim 5, wherein said shaping is by a lost wax process.

14. The die of claim 3, wherein said sintering is at a temperature greater than 1,1000° C.

15. The process of claim 4, wherein said sintering is at a temperature greater than 1,100° C.

16. The process of claim 5, wherein said sintering is at a temperature greater than 1,100° C.

17. The product produced by the process of claim 4.

18. The product produced by the process of claim 6.

19. The product produced by the process of claim 7.

* * * * *